United States Patent [19]

Hirao et al.

[11] 4,443,722

[45] Apr. 17, 1984

[54] ROTOR OF A SUPERCONDUCTIVE ROTARY ELECTRIC MACHINE

[75] Inventors: Toshiki Hirao; Kouichi Okamoto, both of Kobe, Japan

[73] Assignee: Mitsubishi Denki Kabushiki Kaisha, Tokyo, Japan

[21] Appl. No.: 386,416

[22] Filed: Jun. 8, 1982

[30] Foreign Application Priority Data

Jun. 15, 1981 [JP] Japan .................................. 56-92614

[51] Int. Cl.³ .......................................... H02K 15/12
[52] U.S. Cl. ........................................ 310/45; 310/52; 310/270
[58] Field of Search ................... 310/43, 45, 214, 270, 310/271, 10, 52, 61, 64; 336/205

[56] References Cited

U.S. PATENT DOCUMENTS

| 3,395,299 | 7/1968 | Quay | 310/61 |
| 4,143,290 | 3/1979 | Mizukami | 310/61 |
| 4,176,291 | 11/1979 | Rabinowitz | 310/52 |
| 4,239,998 | 12/1980 | Hakamada | 310/45 |
| 4,275,324 | 6/1981 | Flick | 310/214 |

FOREIGN PATENT DOCUMENTS 54-113808  9/1979  Japan .
57-13961   1/1982  Japan .

Primary Examiner—R. Skudy
Attorney, Agent, or Firm—Wenderoth, Lind & Ponack

[57] ABSTRACT

Described is a rotor of a superconductive rotary electric machine in which laminated coil protective covers composed of a plurality of thin-walled cylindrical plates are placed between both end parts of the superconducting field coils and coil holding rings that are mounted at both ends of a coil mounting shaft.

2 Claims, 6 Drawing Figures

ROTOR OF A SUPERCONDUCTIVE ROTARY ELECTRIC MACHINE

BACKGROUND OF THE INVENTION

This invention relates to a rotor of a superconductive rotary electric machine in which laminated coil protective covers composed of a plurality of thin cylindrical plates are placed between the end parts of the superconducting field coils and the coil holder rings that are mounted at both ends of a coil mounting shaft. The main function of the protective covers is to transmit to the holding rings centrifugal or electromagnetic forces and thermal stressed exterted on the holding rings and on the electrical insulation between the field coils and the holding rings and to firmly support said coils. Accordingly, the covers are required to have a thickness of the order of several millimeters.

A conventional protective cover is shown in FIG. 1 and is composed of a pair of semicylindrical insulating segments connected to each other to form a cylinder which is several tens of centimeters in diameter.

The cover is made of two semicylindrical segments because the coil mounting shaft has an outside diameter larger than the inside diameter of the protective cover and hence a cover formed as a one-piece cylinder can not be mounted in position on the mounting shaft.

The protective cover 22 is constructed of a cast or poured insulating material. However these covers are costly because of the expenses involved in machining and molds. In addition, accurate machining is required for machining a protective cover from a blank of insulating material.

Moreover, the peripheral surface of the cover must be made truly circular because the holder ring is fitted on the peripheral surface of the coil end portions. In case of mismatching between the superconducting field coils and the insulating cover, there is produced a gap between the coils and the cover, and difficult operations may be required in machining the semicylindrical insulators to a true circular shape. In any case, a large quantity of an adhesive must be used in the manufacture of the prior-art protective cover 22 and the true circular shape of the cover 22 must be maintained by the use of a compacting tool and by a painstaking assembly operation.

SUMMARY OF THE INVENTION

This invention has been made to overcome these defects of the prior art and has as an object to provide a rotor for a superconductive rotary electric machine wherein the protective cover is a laminated structure and the layers of the protective cover are glued to one another to form a unitary cylindrical protective cover to be mounted on the rotor for the superconducting dynamoelectric machine.

BRIEF DESCRIPTION OF THE DRAWINGS

In the drawings, the same numerals denote the same or equivalent parts.

DETAILED DESCRIPTION OF THE PREFERRED EMBODIMENT

Figure 2:
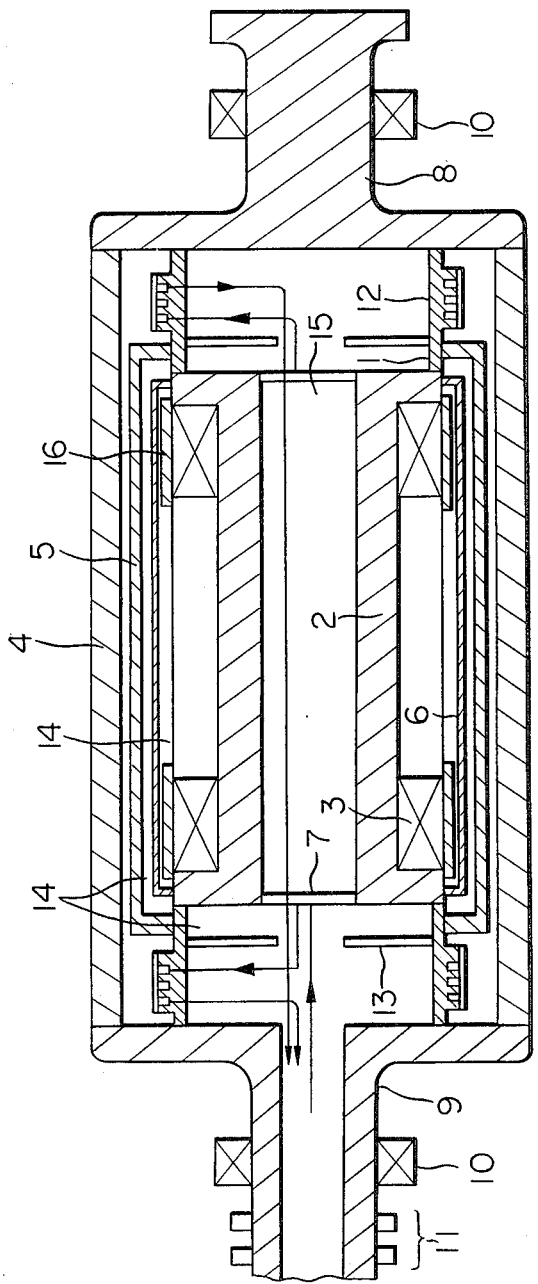
FIG. 2 is a schematic longitudinal cross-section for illustrating the overall structure of the rotor of a superconductive rotary electric machine.

FIG. 2 shows the general structure of a rotor of a superconductive rotary electric machine. In this FIG. 2, the numeral 1 denotes a torque tube, and the numeral 2 a coil carrying shaft forming the central portion of the torque tube. The numeral 3 denotes superconducting field coils secured to the coil mounting shaft 2. The numeral 4 denotes an outer housing wheel acts as a normal temperature damper surrounding said torque tube 1 and the shaft 2. The numeral 5 denotes a low temperature damper mounted between the normal temperature damper 4 and the shaft 2. The numeral 6 denotes a cylindrical helium container wall mounted on the periphery of the shaft 2, and the numeral 7 end plates for the helium container wall and mounted on the end faces of the shaft 2. The numeral 8 denotes a driving end shaft and the numeral 9 a driven end shaft at the end opposite to the driving end shaft. The numeral 10 denotes bearings which support the end shafts 8 and 9. The numeral 1 denotes slip rings for supplying fluid current to the coils. The numeral 12 denotes heat exchangers built in or formed within the torque tubes 1. The numeral 13 denotes side radiation shields. The numeral 14 denotes spaces maintained at vacuum. The numeral 15 denotes a liquid helium sink. The numeral 16 denotes holding rings mounted on both ends of the coil mounting shaft 2.

In the rotor described above, the field coils 3 mounted on the mounting shaft 2 are cooled to an extremely low temperature so that the electrical resistance is reduced substantially to zero. A powerful magnetic field is generated in the 3 which is free from excitation losses, and a.c. power is generated in the stator, not shown. In order that the field coils 3 be cooled to and maintained at an extremely low temperature, usually the liquid helium is introduced from the central portion of the end shaft 9 into a liquid helium vessel defined by the outer sleeve 6 and the end plates 7; the inside of the rotor is maintained at a high vacuum by means of vacuum spaces 14; the torque tube 1 designed to transmit rotational torque to the superconducting field coils 3 and the coil mounting shaft 2 is a thin-walled cylinder; and a heat exchanger 12 is provided to reduce the heat entering the extremely low temperature portion through the torque tube to a minimum possible value. The radiation shields 13 are provided to reduce the heat escaping from both ends by radiation. The normal temperature damper 4 and the low temperature damper 5 operate to shield or protect the field coils 3 from the magnetic field caused by high harmonics from the stator and to damp the rotor vibrations caused by disturbances in the power line. The normal temperature damper 4 and the low temperature damper 5 usually operate at the same time as an outer vacuum tube and as a radiation shield for the helium vessel, respectively. In FIG. 2, the piping system forming a helium inlet and outlet system in the rotor, and helium inlet and outlet devices connected to the rotor, have been omitted for the sake of simplicity.

When NbTi or similar resilient wire material is used for the superconducting field coils, preferably the surface of the coil mounting shaft is provided with axial slots and the superconducting coils are placed in these slots. According to a typical construction of the superconducting field coils, the coils are wound in advance on a former or spool and the resulting assembly is mounted on the coil mounting shaft. There is however an inconvenience in this system that the space for winding the field coil is reduced by an amount equal to the volume of the former or spool and that additional time and labor are necessary for manufacture of the former or spool.

The manner in which the superconducting field coils are placed in the slots provided on the surface of the coil mounting shaft is described below in more detail by referring to FIG. 3.

Figure 3:
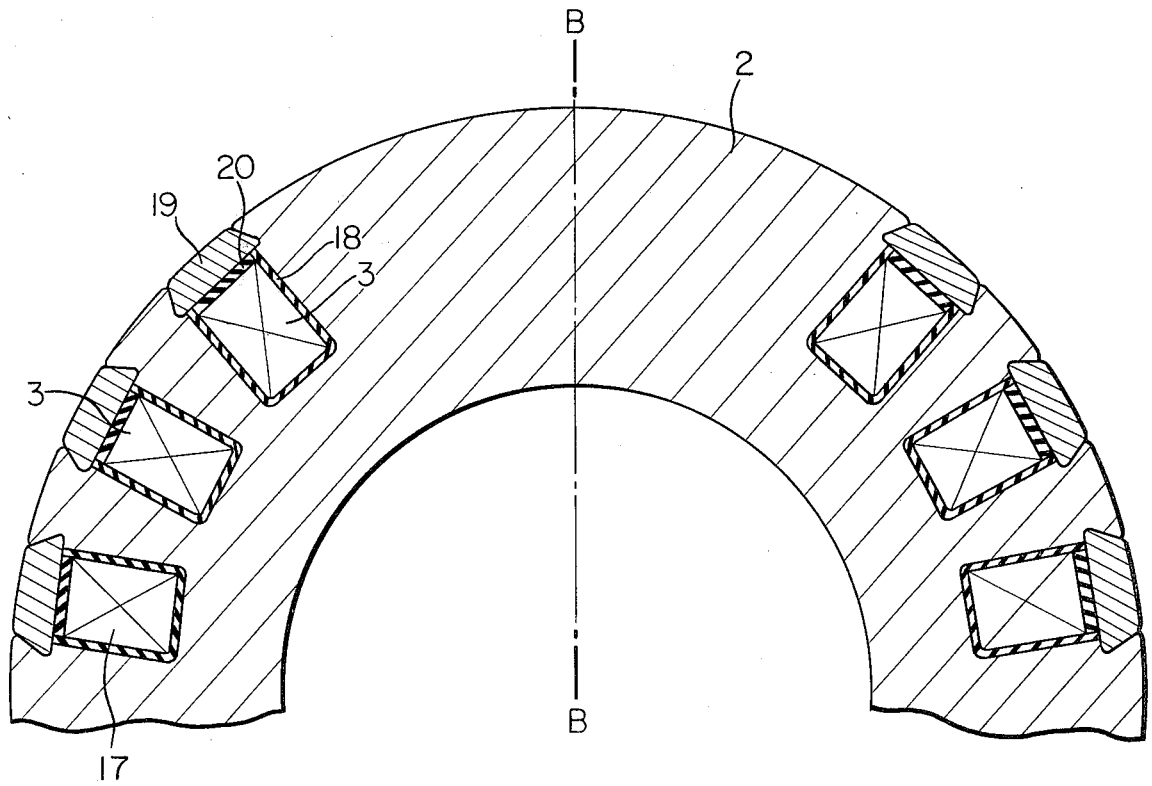
FIG. 3 is a partial transverse cross-section showing the structure of the field coil.

In FIG. 3, the numeral 2 denotes the coil mounting shaft, and the numeral 17 denotes the axial slots formed in the surface of the coil mounting shaft 2. The numeral 3 denotes superconducting field coils placed in the slots 17. The numeral 18 denotes in insulating layer provided in each slot 17. The numeral 19 denotes a wedge for locking each coil 3 in the slot, and the numeral 20 denotes an insulation provided on the wedge.

In FIG. 3, the superconducting field coils 3 encircle the pole line B-B and hence a powerful magnetic field is generated about the line B-B.

Figure 4:
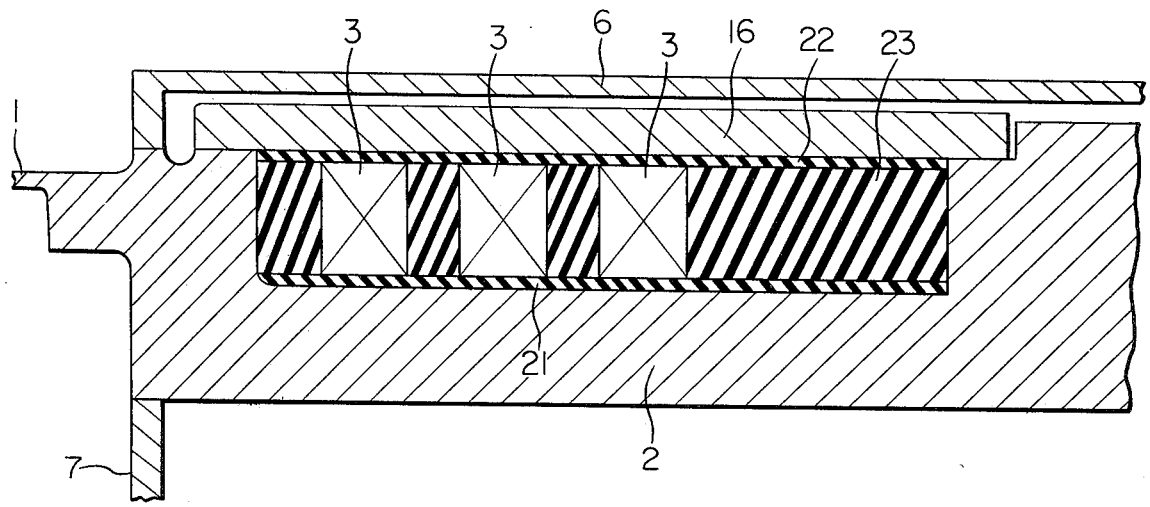
FIG. 4 is a longitudinal cross-section for illustrating the structure of the end part of the field coil and shaft.

FIG. 4 shows the end part of the coil mounting shaft 2 of FIG. 2, that is, the coil end portions of the superconducting field coils 3, in more detail.

In FIG. 4, the numeral 2 denotes the coil mounting shaft, and the numeral 16 denotes the keeper sleeve which is shrink fitted to the shaft 2. The numeral 21 denotes cylindrical insulating layer mounted at the bottom of the recess in the stepped end portion of the coil mounting shaft 2. The numeral 23 denotes an insulation padding or filler driven firmly into the space between adjoining coil end portions and into the space between the coil end portions and the end wall of the recess. The numeral 22 denotes a protective cover mounted surrounding the coils.

Figure 5:
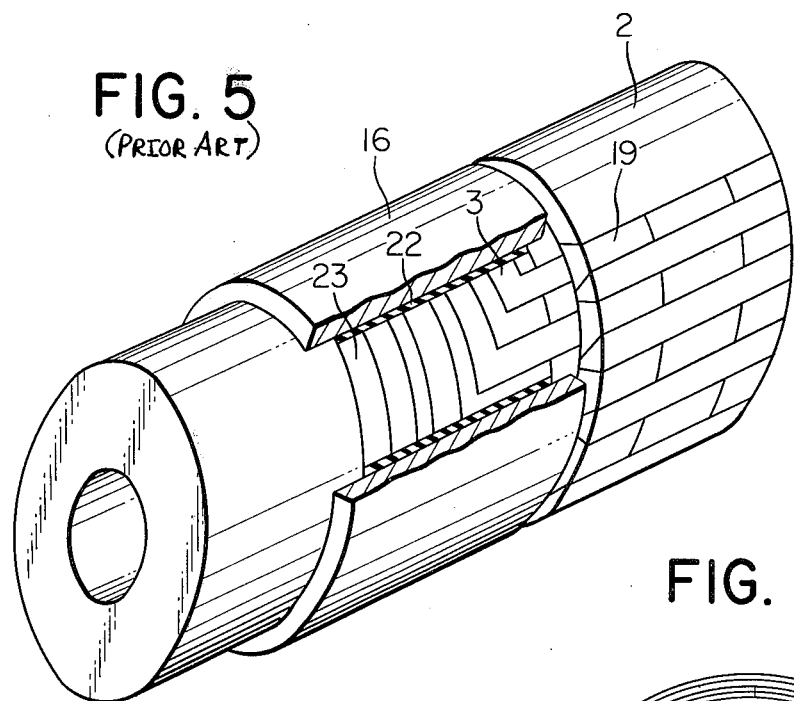
FIG. 5 is a perspective view, partly broken away, of the structure shown in FIG. 4.

FIG. 5 is a perspective view for better understanding of the structure of FIG. 4 and illustrates the end part of the coil mounting shaft 2. The reference numerals indicated in the drawing are the same as those used in FIG. 4.

In the construction of the end part as described above, the coil end portions of the superconducting field coils 3 are not only surrounded with insulating material but are pressed by the holder rings 16 so that the coils may be held highly reliably held in position in the recess. Moreover by the protective cover 22, centrifugal or electromagnetic forces or thermal stress exerted on the electrical insulation between the field coils 3 and the keeper sleeve 16 and on the field coils 3 are transmitted to the keeper sleeve 16 and the latter is retained positively.

Figure 1:
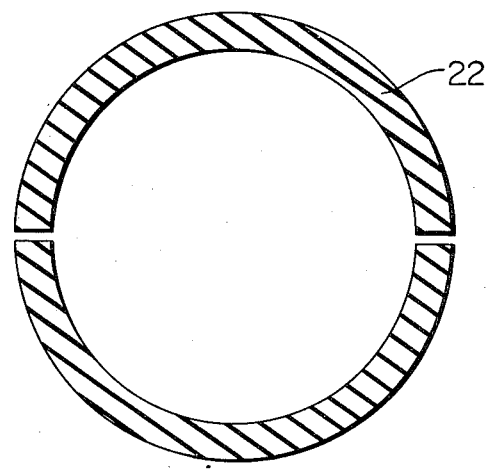
FIG. 1 is a transverse cross-section showing a prior art coil protective cover used in a rotor of a superconductive rotary electric machine.

The protective cover 22 of the prior art is constructed as shown in FIG. 1 and has many defects as described hereinbefore.

Figure 6:
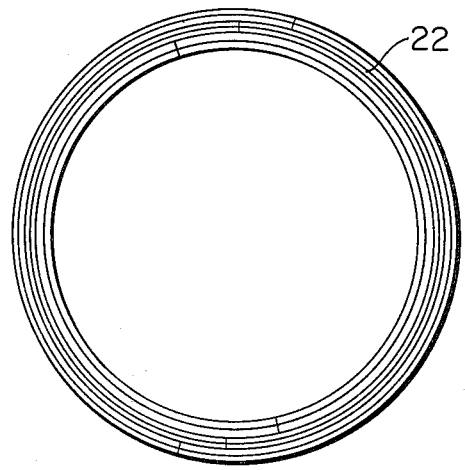
FIG. 6 is an end view showing an embodiment of the protective cover of the present invention used in a rotor of a superconductive rotary electric machine.

FIG. 6 illustrates a preferred embodiment of a protective cover 22 of the present invention for the rotor of FIGS. 1-5. The cover 22 is constructed of several thin cylindrical insulating layers which are bonded to one another with an adhesive. In the embodiment illustrated, each layer is formed by two semi-cylindrical plates which are joined to each other at diametrically opposite points. A plurality of pairs of such semicylindrical plates are glued to one another to form a laminated cover in such a manner that the joints of the semicircular plates of each pair are circumferentially offset from layer to layer for providing a sufficient strength as an protective cover 22. The thickness of the insulating plates made such that the resulting ring is easily available, have a small a number of component plates and exhibit a certain degree of flexibility. For example, a laminated ring made of a thermohardening plastic plates with a thickness of 0.5 mm may be employed.

In this manner, the cover 22 can be manufactured at a low cost, because it is made of plastic insulating plates that are easily commercially available at a low cost.

Because the covers 22 can be manufactured and mounted on the coil mounting shaft 2 at the same time, the manufacturing operation can be simplified.

According to the present invention, as described above each protective cover is constructed of laminated layers of thin-walled cylindrical plates glued to one another and the rotor of the superconducting dynamoelectric machine can be assembled at a reduced cost by employing such protective covers for protection of the superconducting field coils.

What is claimed is:

1. A rotor for a superconductive rotary electric machine comprising:
   a shaft having longitudinal slots along the outer surface thereof and an end portion at each end with an annular recess therearound;
   superconducting field coils in said slots and having circumferentially extending coil end portions in said recesses and spaced in the direction of the length of said shaft;
   insulation filler filling the spaces in said recesses between adjacent coil end portions;
   keeper sleeves shrink fitted around the end portions of said shaft; and
   a laminated insulating cover between each keeper sleeve and the coil end portions and composed of a plurality of thin cylindrical layers adhered to each other, each of said layers being a thin sheet of a prefabricated single insulating material constituted by at least two insulating plates with the circumferentially facing edges abutting each other at points displaced circumferentially from joints in other layers, said keeper sleeves and cover tightly holding said coil end portions in said recess.

2. The rotor claimed in clam 1 in which said insulating thin sheets are made of thermohardening plastic material.

* * * * *